United States Patent [19]
Mantelet

[11] 3,970,258
[45] July 20, 1976

[54] MINCING MACHINE

[75] Inventor: Jean Mantelet, Paris, France

[73] Assignee: Moulinex, Societe Anonyme, Bagnolet, France

[22] Filed: July 29, 1975

[21] Appl. No.: 600,184

[30] Foreign Application Priority Data
Oct. 1, 1974  France .............................. 74.32977

[52] U.S. Cl. .......................................... 241/282.1
[51] Int. Cl.² ....................................... B02C 18/12
[58] Field of Search ............ 241/199.12, 277, 282.1, 241/282.2

[56] References Cited
UNITED STATES PATENTS

| | | | |
|---|---|---|---|
| 3,493,022 | 2/1970 | Mantelet | 241/199.12 |
| 3,596,692 | 8/1971 | Swanke | 241/199.12 |
| 3,627,008 | 12/1971 | Samuelian | 241/199.12 |
| R24,607 | 2/1959 | Seyfried | 241/282.1 X |

Primary Examiner—Granville Y. Custer, Jr.
Assistant Examiner—Howard N. Goldberg
Attorney, Agent, or Firm—Young & Thompson

[57] ABSTRACT

The cutting blades of an electrically driven mincing machine are carried by a sleeve which fits over a driving element at the top of a vertical motor-driven shaft. The sleeve and driving element are provided internally and externally respectively with driving ramps which extend helically from bottom to top thereof in the direction of rotation of the driving element and which have active surfaces which engage one with the other during driving of the sleeve. The sleeve and driving element are also provided internally and externally respectively with retaining ramps which extend helically from bottom to top thereof in a direction opposite the direction of rotation of the driving element and which have active surfaces engageable one with the other where the driving element stops rotating thereby to prevent escape of the sleeve in an upward direction.

4 Claims, 10 Drawing Figures

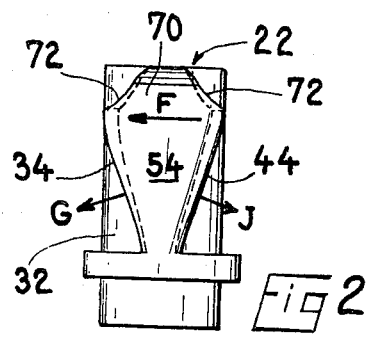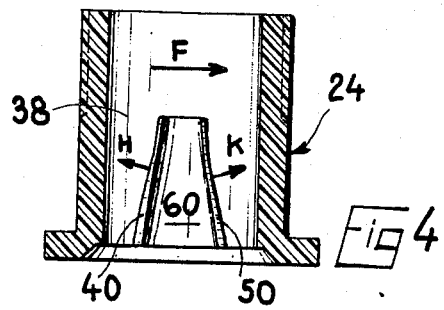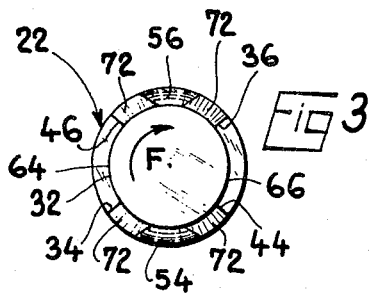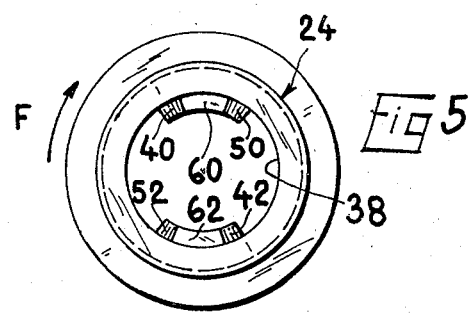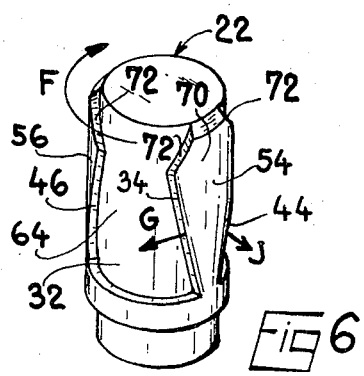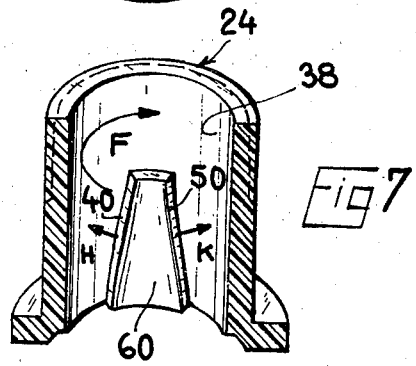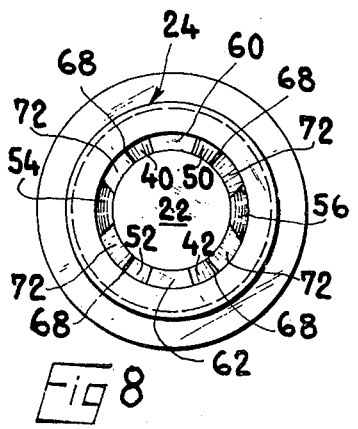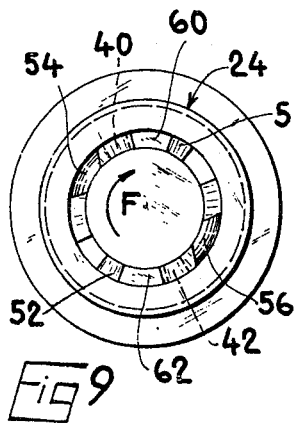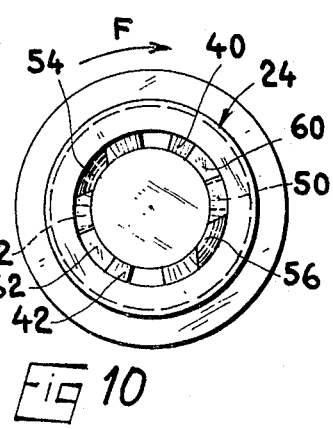

3,970,258

MINCING MACHINE

BACKGROUND OF THE INVENTION

1. Field of the Invention

The invention relates to domestic electrical appliances, such as mincers, which have a rotating tool, such as a cutting blade, mounted on the top end of a vertical motor-driven shaft by means of a detachable coupling device comprising a driving element rigidly fastened to the shaft and engageable in a sleeve rigidly fastened to the tool.

2. Description of the Prior Art

In one such kind of appliance as described in U.S. Pat. No. 3,493,022, J. Mantelet, the driving element is provided on the exterior thereof with at least one helical driving spline which winds from bottom to top of the element in the direction of rotation of the driving means and has its active surface facing downwards, while in complementary manner the sleeve carries on the interior thereof at least one helical groove which winds from bottom to top in the aforesaid direction of rotation, but which has its active surface facing upwards. A coupling device of this kind provides in particular the advantage of ensuring that the tool carrier sleeve will be correctly coupled to the driving element as soon as the motor is started up, since the rotation of the shaft of the motor causes the driving spline carried by the drivilng element to engage spontaneously with the complementary groove in the sleeve.

Nevertheless, in certain cases it occurs that the tool continues to turn through the effect of inertia when the motor is abruptly stopped, and then escapes from its driving means, with the consequent risk of causing damage.

It is an object of the present invention to eliminate or greatly reduce this risk of the release of the tool.

SUMMARY

In an electrically driven domestic appliance according to the invention the driving element carries not only at least one helical driving ramp, but in addition at least one helical retaining ramp which has its active surface facing downwards but which winds from bottom to top in the opposite direction to the direction of rotation of the driving element, while in a complementary manner the sleeve carries internally not only at least one helical driving ramp but also at least one helical retaining ramp which winds from bottom to top in the opposite direction to the direction of rotation of the driving element and has its active surface facing upwards.

Due to this arrangement of the appliance, if the tool carrier sleeve continues to turn after the driving means has stopped, the retaining ramp carried by the sleeve will be spontaneously engaged under the complementary retaining ramp carried by the driving element, thus securing the sleeve against escape in the upward direction.

BRIEF DESCRIPTION OF THE DRAWINGS

FIG. 2 is an elevation, to an enlarged scale, of a driving element forming part of a coupling device with which the mincer shown in FIG. 1 is equipped;

FIG. 3 is a top plan of FIG. 2;

FIG. 4 is a diametrical section of a tool carrier sleeve to be associated with the driving element of FIGS. 2 and 3;

FIG. 5 is a top view of the sleeve of FIG. 4;

FIGS. 6 and 7 show respectively, in perspective, the driving element and the sleeve, the sleeve being partly broken away in a diametrical plane; and FIGS. 8, 9, and 10 are top plan views of the sleeve engaged on the driving element, in the position of rest, the driving position, and the retained position respectively.

DESCRIPTION OF THE PREFERRED EMBODIMENT

Figure 1:
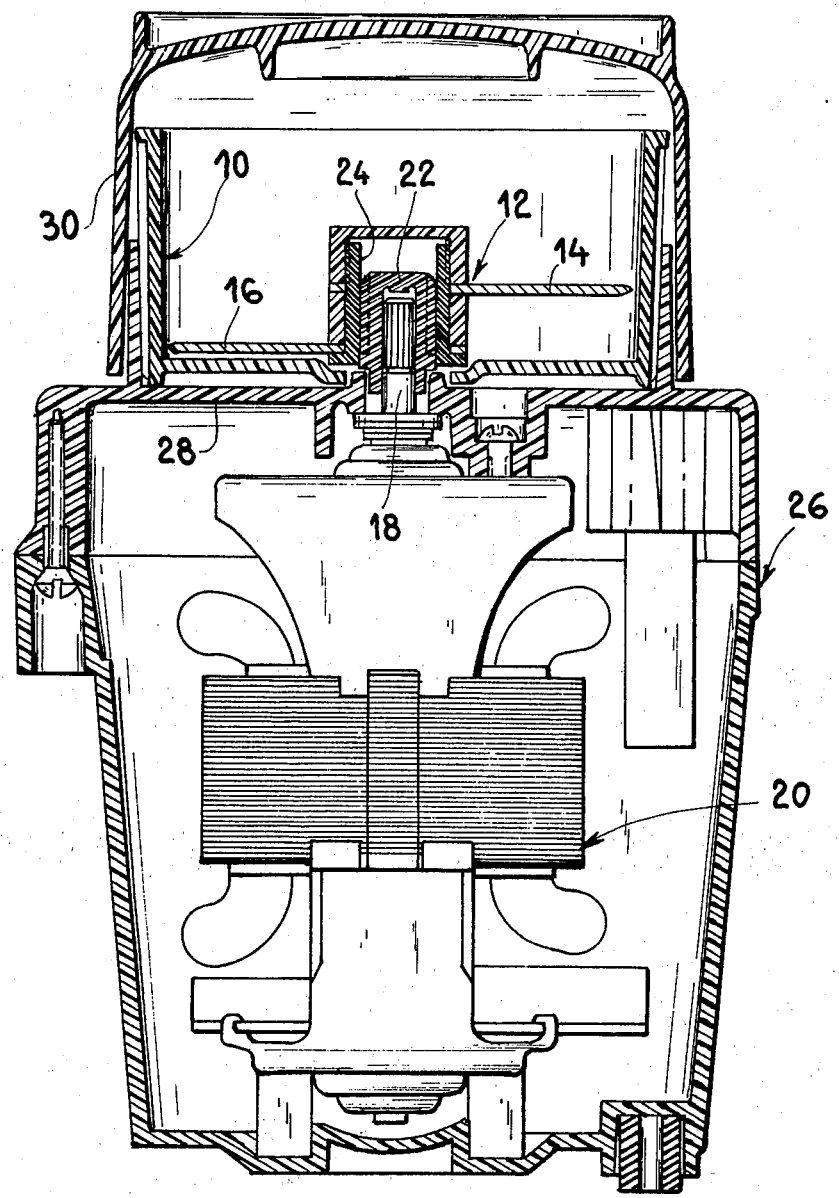
FIG. 1 illustrates, in section, an electrically driven domestic mincer to which the invention is applied.

Referring to the drawing, the mincer shown in FIG. 1 comprises a working bowl 10 in which rotates a rotatable tool 12 composed of a cutting blade equipped with two cutters 14 and 16 and mounted on the top end of a shaft 18 of a motor 20. The shaft 18 has a vertical axis and is coupled to the tool 12 by a detachable coupling device comprising a driving element 22, which is rigidly fastened to the shaft 18 and on which is engaged a sleeve 24 rigidly fastened to the tool 12. The motor 20 is contained in a casing 26 whose top wall 28 supports the bowl 10 and above which is disposed a lid 30 closing the bowl.

The driving element 22, which is of generally cylindrical shape, carries on its side surface 32 two helical driving ramps 34 and 36 (FIGS. 3, 2, and 6) which wind from bottom to top in the direction of rotation of the motor, that is to say in the direction of rotation of the driving element (arrows F in the drawings), and which have their active surfaces facing downwards (in the direction of the arrows G), while in complementary manner the sleeve 24 (FIGS. 4, 5, and 7) carries on its inner cylindrical surface 38 two helical driving ramps 40 and 42 which likewise wind from bottom to top in the said direction of rotation, but which have their active surfaces facing upwards (in the direction of the arrows H).

According to the invention the driving element 22 (FIGS. 2, 3, and 6) carries two additional helical retaining ramps 44 and 46 which have their active surfaces facing downwards (arrows J), but which wind from bottom to top in the opposite direction to the direction of rotation F of the driving element, while in complementary manner the sleeve 24 (FIGS. 4, 5, and 7) carries two helical retaining ramps 50 and 52, which likewise wind from bottom to top in the opposite direction to the rotation F, but which have their active surfaces facing upwards (arrows K).

The driving ramp 34 and the retaining ramp 44 which are carried by the driving element 22 are formed respectively by the two sides of a boss 54 carried by the side surface 32 of the driving element. Similarly, the ramps 36 and 46 are formed by the sides of a boss 56 carried by the surface 32. The driving ramp 40 and the retaining ramp 50 which are carried by the sleeve 24 are similarly formed respectively by the two sides of a boss 60 carried by the inner surface 38 of the sleeve 24. In the same way, the ramps 42 and 52 are formed by the sides of a boss 62 carried by the inner surface 38 of the sleeve.

As can clearly be seen in the drawings, the bosses 54 and 56 of the driving element 22 are diametrically opposite, and the bosses 60 and 62 of the sleeve 24 are in turn diametrically opposite. Because of the slopes of the ramps which laterally bound the bosses, the four bosses are all of a generally trapezoidal shape. The central surfaces of the bosses 54 and 56 of the driving element are convexly cylindrical, while the central surfaces of the bosses 60 and 62 of the sleeve are concavely cylindrical.

In order to permit the engagement of the sleeve on the driving element, the diametrically opposite angular spaces 64 and 66 left between the bosses 54 and 56 of the driving element (FIGS. 3 and 6) are sufficient to enable the bosses 60 and 62 of the sleeve to pass freely therein in the vertical direction with slight clearance, as indicated at 68 in FIG. 8, which shows the sleeve seen from above immediately after being engaged on the driving element and in the position of rest, that is to say before the driving element is set in motion. It will be noted that each of the bosses 54 and 56 of the driving element has an upward extension 70, whose sides 72 are inclined in the direction of the spaces 64 and 66 left between the bosses 54 and 56, and that they thus form ramps for the introduction of the bosses 60 and 62 of the sleeve in the direction of the spaces 64 and 66.

As will be understood, as soon as the driving element rotates the driving ramps 34 and 36 carried by the driving element will be spontaneously engaged respectively with the complementary driving ramps 40 and 42 carried by the sleeve, thus ensuring the driving of the sleeve by the driving element. This driving position is illustrated in FIG. 9.

After the driving element has stopped, if the sleeve should continue to turn through the effect of inertia, the retaining ramps 50 and 52 carried by the sleeves will be spontaneously engaged respectively under the complementary retaining ramps 46 and 44 carried by the driving element, thus preventing the sleeve from escaping in the upward direction. This position of retention is illustrated in FIG. 10.

Thus, the simple fact of forming on the driving element and on the sleeve inclined ramps having an inverse pitch to that of the driving ramps provides the mincer with an additional feature of operational safety.

I claim:

1. An electrically driven domestic appliance comprising a rotatable tool mounted on the top end of a vertical motor-driven shaft by a detachable coupling device comprising a driving element rigidly fastened to the shaft and engageable in a sleeve rigidly fastened to the tool, the driving element and sleeve being provided respectively on the exterior and the interior thereof with complementary helical driving ramps which wind from bottom to top of said element and sleeve in the direction of rotation of the driving element and have active surfaces engageable one with the other during driving of the tool, and said driving element and sleeve being additionally provided respectively on the exterior and interior thereof with complementary helical retaining ramps which wind from bottom to top of said element and sleeve in the opposite direction to the direction of rotation of the driving element and have active surfaces engageable one with the other when the driving element stops rotating, the active surface of each driving element ramp facing downwards and the active surface of each sleeve ramp facing upwards.

2. An electrically driven domestic appliance according to claim 1, wherein the driving ramp and the retaining ramp carried by the driving element are formed respectively by two sides of a boss carried by the side surface of the driving element, and the driving ramp and the retaining ramp carried by the sleeve are formed respectively by two sides of a boss carried by the inner surface of the sleeve.

3. An electrically driven domestic appliance according to claim 2, wherein the driving element and the sleeve each carry two diamwtrically opposite bosses, thereby to form on each of them two driving ramps and two retaining ramps, the diametrically opposite bosses of the driving element having therebetween diametrically opposite spaces sufficient to enable the bosses of the sleeve to pass freely therein in the vertical direction. diametrically 4. An electrically driven domestic appliance according to claim 3, wherein each of the bosses of the driving element has an upward extension whose sides are inclined in the direction of the spaces left between the bosses of the driving means thereby to form ramps for the introduction of the bosses of the sleeve in the direction of the said spaces.

* * * * *